United States Patent
Wu

(10) Patent No.: US 6,220,568 B1
(45) Date of Patent: Apr. 24, 2001

(54) CONTROLLING SWITCH OF AN ATOMIZER HANDLE

(75) Inventor: Jui-Lung Wu, Chang Hua Hsien (TW)

(73) Assignee: FWU Tien Industry Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/525,751

(22) Filed: Mar. 14, 2000

(51) Int. Cl.⁷ ............................. F16K 35/00; F16K 31/44
(52) U.S. Cl. ...................................... 251/114; 251/239
(58) Field of Search .................................. 251/107, 114, 251/239, 246

(56) References Cited

U.S. PATENT DOCUMENTS

| | | | | |
|---|---|---|---|---|
| 557,292 | * | 3/1896 | Turner | 251/107 |
| 1,606,191 | * | 11/1926 | Sibenmann | 251/114 |
| 2,038,508 | * | 4/1936 | Elliot | 251/114 |
| 2,271,151 | * | 1/1942 | Fina et al. | 251/114 |
| 2,280,615 | * | 4/1942 | Baldwin | 251/114 |
| 2,344,556 | * | 3/1944 | Manley | 251/114 |
| 2,500,214 | * | 3/1950 | Stroop | 251/114 |
| 2,743,079 | * | 4/1956 | Sills | 251/107 |
| 2,783,092 | * | 2/1957 | Gavin et al. | 251/107 |
| 2,884,953 | * | 5/1959 | McWilliams | 251/114 |
| 2,899,169 | * | 8/1959 | Klingler | 251/114 |
| 3,041,038 | * | 6/1962 | Yocum | 251/114 |
| 3,643,691 | * | 2/1972 | Huthsing, Jr. | 251/239 |
| 3,927,834 | * | 12/1975 | Tada | 251/114 |
| 5,042,527 | * | 8/1991 | Geimer | 251/246 |

\* cited by examiner

Primary Examiner—Kevin Shaver
Assistant Examiner—D. Austin Bonderer
(74) Attorney, Agent, or Firm—Bacon & Thomas, PLLC

(57) ABSTRACT

Controlling switch structure of an atomizer handle, including a handle main body, a trigger, a stop lever, a long pivot pin, a short pivot pin, a controlling pin, a compression spring and a sealing cap. A top edge of the front end of the main body is disposed with a pivot seat. A pivot block is disposed on rear side of the pivot seat. A lower edge of the front end of the trigger is formed with a pivot hole. The top face of the front section of the trigger is formed with a rectangular perforation. Two sides of rear end of the rectangular perforation are respectively disposed with two arched retaining blocks. One end of the stop lever is disposed with two pivot plates. The other end thereof is disposed with an engaging section. A lower section of the controlling pin is disposed with a toothed flange. A large water sealing ring is inlaid on upper side of the toothed flange. A middle section of the controlling pin is formed with an annular groove. The upper section of the controlling pin is inlaid with two small water sealing rings. A stepped fitting boss is disposed at the center of the sealing cap. The controlling pin is pressed by both of the resilient force of the compression spring and the water pressure so that the water can be reliably sealed.

2 Claims, 4 Drawing Sheets

CONTROLLING SWITCH OF AN ATOMIZER HANDLE

BACKGROUND OF THE INVENTION

The present invention relates to a controlling switch structure of an atomizer handle, in which the controlling pin is pressed by both of the resilient force of a compression spring and the cooperative water pressure so that a large water sealing ring inlaid on the controlling pin is pressed against the shoulder section of the stepped socket of the handle main body so as to reliably seal the water without leakage.

FIGS. 1 and 2 show a conventional controlling switch structure of an atomizer handle. The controlling switch structure includes a handle main body 1 and a cap member 2 locked on top face of front section of the main body 1. A water sealing pad 3 is disposed between the cap member 2 and the main body 1. A push rod 4 is fitted in the cap member 2. A trigger 5 is pivotally connected with the cap member 2. A spring 6 is compressed between bottom face of rear end of the trigger 5 and top face of rear end of the main body 1. The spring 6 resiliently upward pushes the rear end of the trigger 5 to make the front end thereof depress the push rod 4 to press down the water sealing pad 3. At this time, the water sealing pad 3 seals a turning mouth 1a of the water passage inside the main body 1 so as to cut off the water flow. The top face of rear section of the main body 1 is disposed with a pair of lugs 7 for pivotally connecting with a latch rod 8. The bottom face of rear section of the trigger 5 is disposed with a latch seat 9. When atomized, the rear section of the trigger 5 is downward pressed to compress the spring 6 (as shown in FIG. 3) and the latch rod 8 is upward pivotally rotated to latch with the latch seat 9 of the trigger 5. At this time, the front end of the trigger 5 is lifted to release the push rod 4 from the pressing force. Under such circumstance, by means of the pressure of the water flow and the resilient restoring force of the water sealing pad 3, the water sealing pad 3 is upward moved to separate from the turning mouth 1a of the water passage of the main body 1. Therefore, the water can flow through the water passage of the main body 1 to be atomized.

The above conventional structure has a shortcoming as follows:

When cutting off the water, the front end of the trigger 5 downward presses the push rod 4 to seal the turning mouth 1a of the water passage of the main body 1 simply by means of the resilient force of the spring 6 which lifts the rear end of the trigger 5. After a period of use, the water sealing pad 3 tends to deform and the water sealing effect will be deteriorated. As a result, leakage may take place.

SUMMARY OF THE INVENTION

It is therefore a primary object of the present invention to provide a controlling switch structure of an atomizer handle, in which the controlling pin is pressed by both of the resilient force of a compression spring and the cooperative water pressure so as to reliably seal the water without leakage.

The present invention can be best understood through the following description and accompanying drawings wherein:

DETAILED DESCRIPTION OF THE PREFERRED EMBODIMENT

Figure 4:
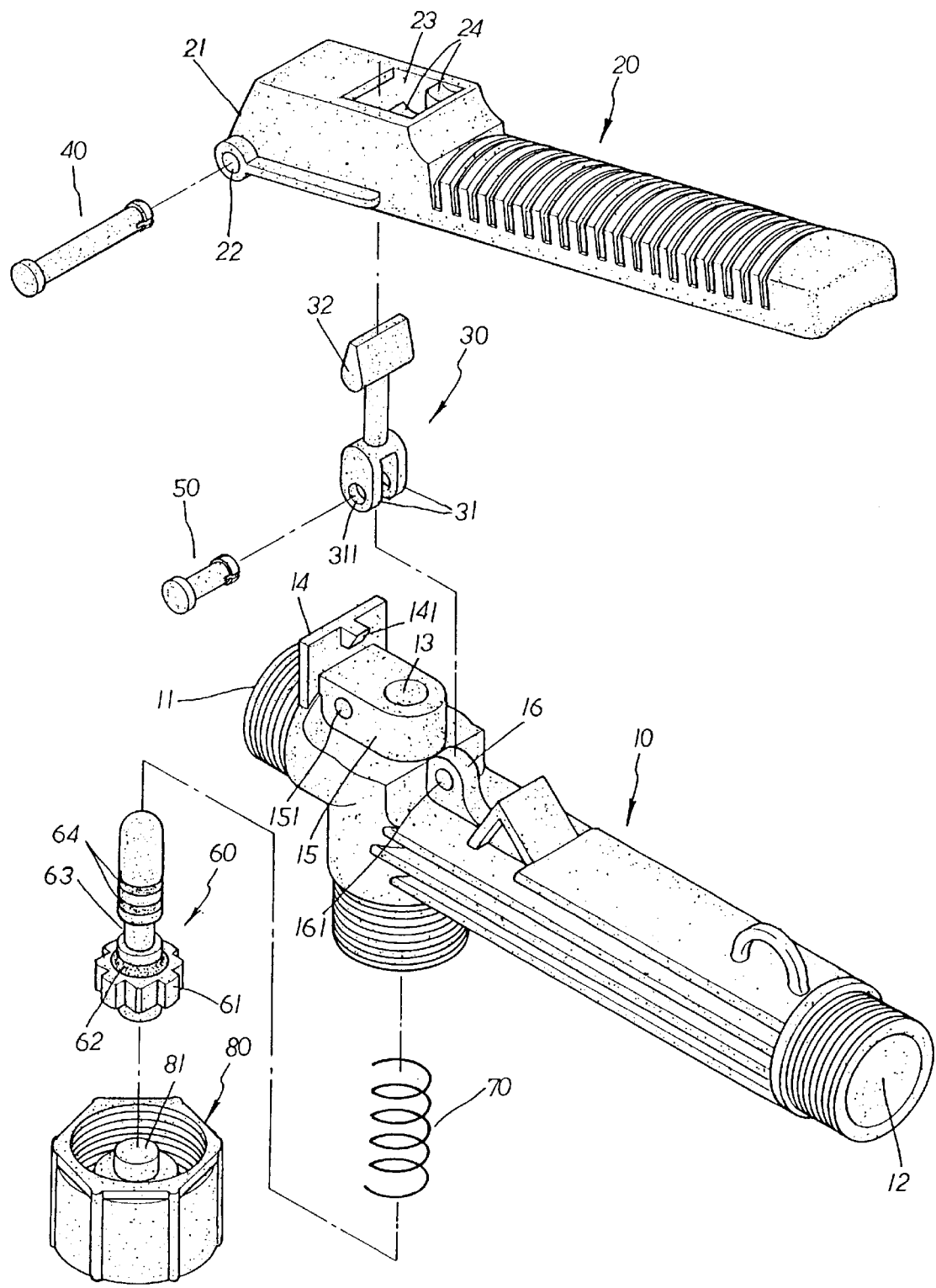
FIG. 4 is a perspective exploded view of the controlling switch structure of an atomizer handle of the present invention.

Please refer to FIG. 4. The present invention includes a handle main body 10, a trigger 20, a stop lever 30, a long pivot pin 40, a short pivot pin 50, a controlling pin 60, a compression spring 70 and a sealing cap 80. The front end face of the main body 10 is formed with an axial water outgoing passage 11 (referring to FIG. 6). The rear end face of the main body is formed with an axial water incoming passage 12. In addition, the front section of the main body is formed with a radial stepped socket 13 having a small diameter section communicating with the water outgoing passage 11 and a large diameter section communicating with the water incoming passage 12. The top edge of front end of the main body 10 is disposed with a restricting plate 14. The middle of rear face of upper end of the restricting plate 14 is disposed with a trapezoid restricting block 141. A pivot seat 15 formed with a pivot hole 151 is disposed on rear side of the restricting plate 14. A pivot block 16 formed with a pivot hole 161 is disposed on rear side of the pivot seat 15. The front end face 21 of the trigger 20 is a slope. The lower edge of the front end of the trigger 20 is formed with a pivot hole 22. The top face of the front section of the trigger 20 is formed with a rectangular perforation 23. Two sides of rear end of the rectangular perforation 23 are respectively disposed with two arched retaining blocks 24. One end of the stop lever 30 is disposed with two pivot plates 31 each having a pivot hole 311. The other end thereof is disposed with a cam-like engaging section 32. The lower section of the controlling pin 60 is disposed with a toothed flange 61. A large water sealing ring 62 is inlaid on upper side of the toothed flange 61. The middle section of the controlling pin 60 is formed with an annular groove 63. The upper section of the controlling pin 60 is inlaid with two small water sealing rings 64. A stepped fitting boss 81 is disposed at the center of the sealing cap 80.

Figure 1:
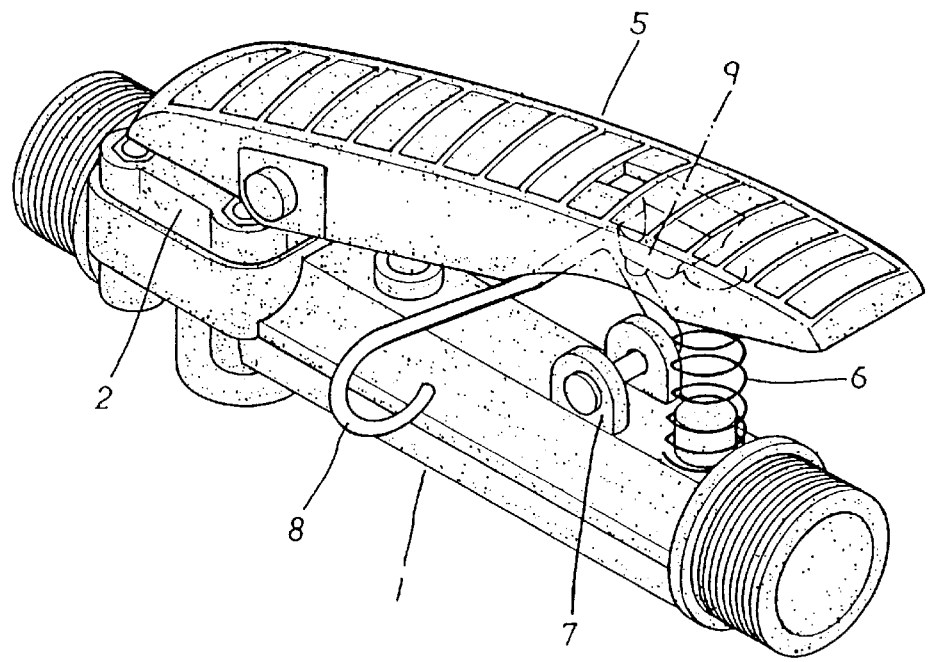
FIG. 1 is a perspective assembled view of a conventional controlling switch structure of an atomizer handle.
Figure 2:
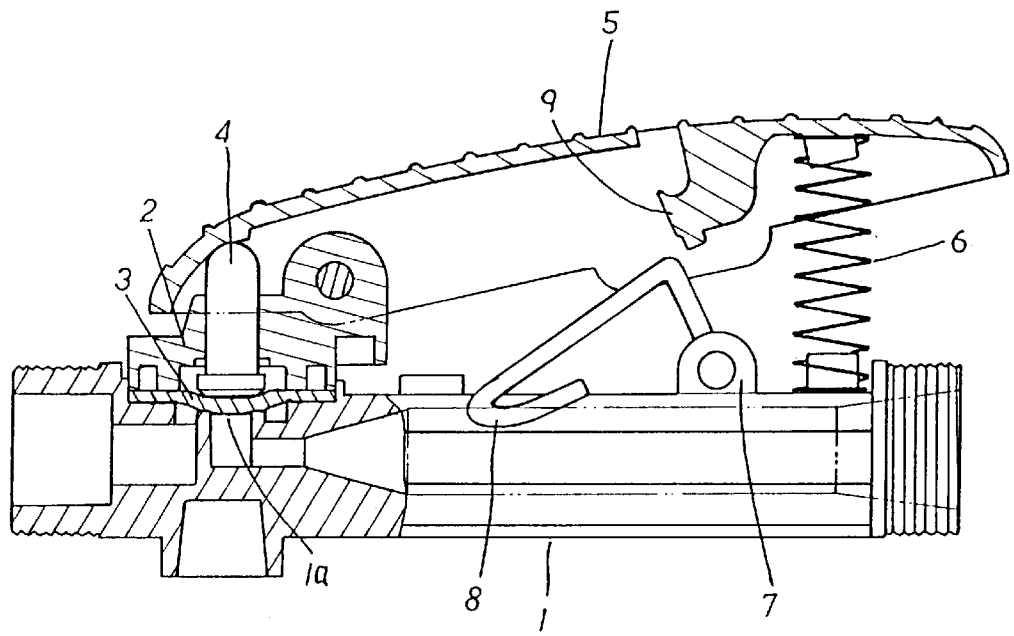
FIG. 2 is a sectional assembled view of the conventional controlling switch structure of an atomizer handle.
Figure 3:
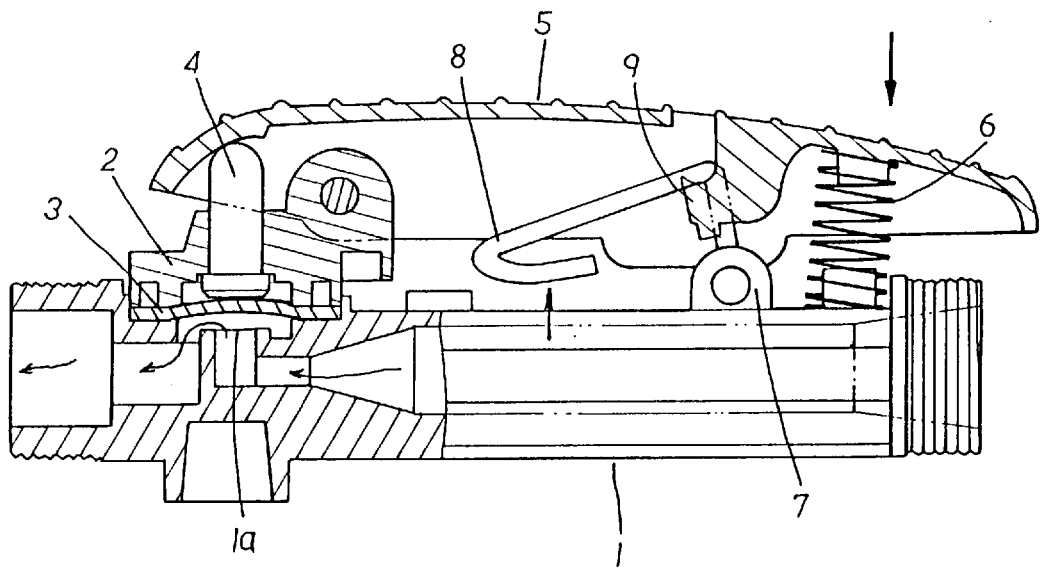
FIG. 3 is a sectional assembled view according to FIG. 2, showing the atomization operation of the conventional controlling switch structure of an atomizer handle.
Figure 5:
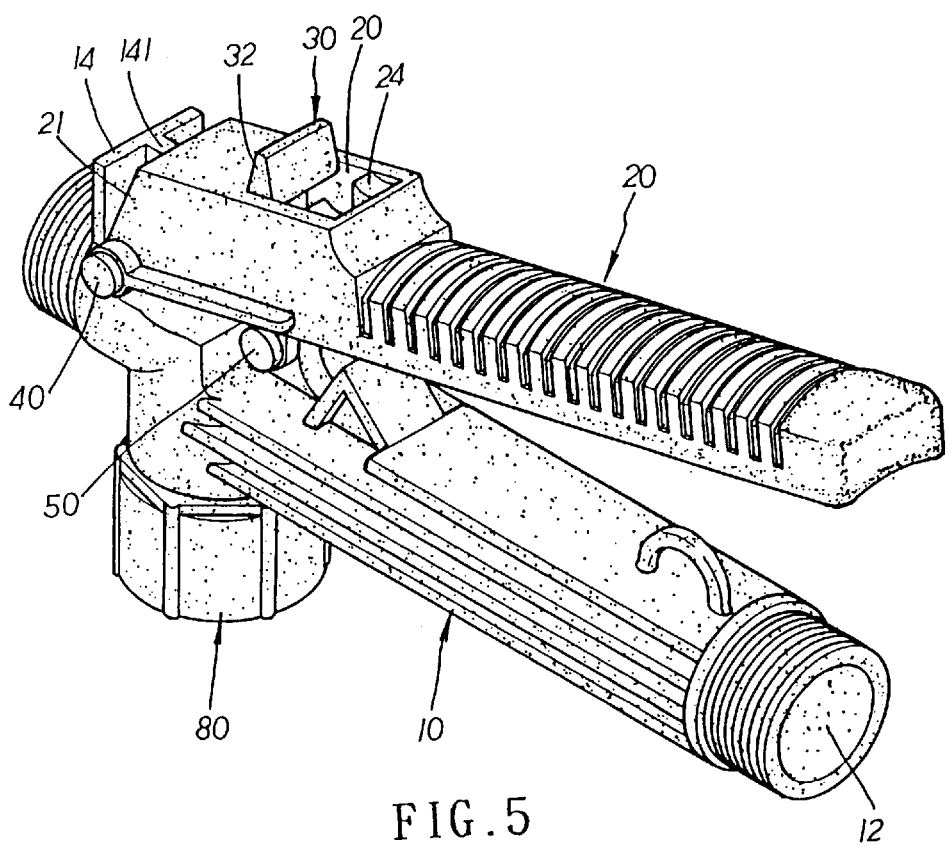
FIG. 5 is a perspective assembled view of the controlling switch structure of an atomizer handle of the present invention.
Figure 6:
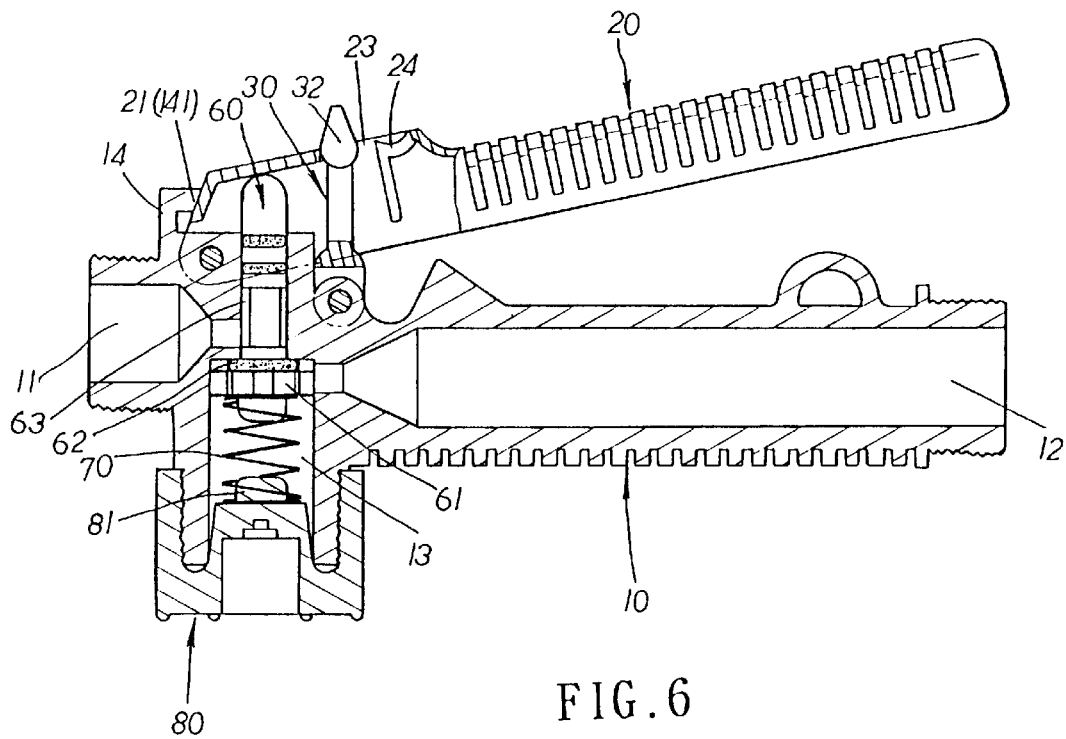
FIG. 6 is a sectional assembled view of the controlling switch structure of an atomizer handle of the present invention.

Please refer to FIGS. 5 and 6. When assembled, the two pivot plates 31 of the stop lever 30 are fitted on two sides of the pivot block 16 of the main body 10. The short pivot pin 50 is passed through the pivot holes 311 of the pivot plates 31 and the pivot hole 161 of the pivot block 16 to pivotally connect the stop lever 30 with the main body 10. The trigger 20 is positioned on top face of the main body 10 with the stop lever 30 fitted in the rectangular perforation 23 of the trigger 20. The long pivot pin 40 is passed through the pivot hole 22 of the lower edge of front end of the trigger 20 and the pivot hole 151 of the pivot seat 15 of the main body 10 to pivotally connect the trigger with the main body. The slope front end face 21 of the trigger 20 is restricted by the trapezoid restricting block 141 of the restricting plate 14 of the main body 10. The controlling pin 60 is fitted into the stepped socket 13 of the main body 10. The upper end section of the controlling pin 60 protrudes beyond the stepped socket 13 to abut against the bottom face of the front section of the trigger 20. The compression spring 70 is then fitted into the large diameter section of the stepped socket 13 of the main body 10 with one end of the spring 70 fitted with the lower end of the controlling pin 60. Then the sealing cap 80 is screwed onto the wall of the opening of the large diameter section of the stepped socket 13 with the other end of the spring 70 fitted on a small diameter section of the stepped fitting boss 81. At this time, the spring 70 is compressed to a certain extent and the controlling pin 60 is lifted to press the large water sealing ring 62 against the shoulder section of the stepped socket 13 of the main body 10 so as to seal the water.

Figure 7:
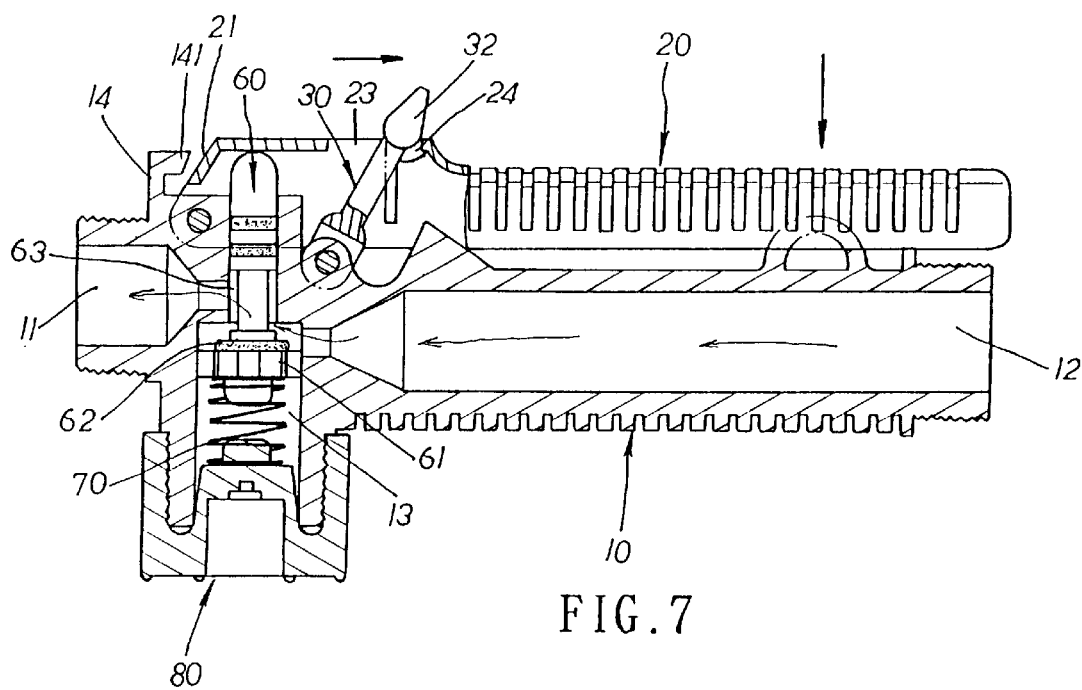
FIG. 7 is a sectional assembled view according to FIG. 6, showing the atomization operation of the controlling switch structure of an atomizer handle of the present invention.

Please refer to FIG. 7. When atomized, the rear section of the trigger 20 is downward pressed and the stop lever 30 is rearward shifted to latch the engaging section 32 thereof on the arched retaining blocks 24 of rear side of the rectangular perforation 23 of the trigger 20. Under such circumstance, the trigger 20 is fixed in a pressed state and the bottom face of the front section of the trigger 20 downward presses the controlling pin 60. At this time, the controlling pin 60 downward compresses the spring 70 and the large water sealing ring 62 is disengaged from the shoulder section of the stepped socket 13 of the main body 10. Therefore, the water can flow from the water incoming passage 12 of the main body 10 through the stepped socket 13 and the annular groove 63 of the controlling pin 60 to be atomized and discharged from the water outgoing passage 11.

According to the above arrangement, when sealing the water, the controlling pin 60 is pressed by both of the resilient force of the compression spring 70 and the cooperative water pressure so that the leakage is avoided.

The above embodiment is only used to illustrate the present invention, not intended to limit the scope thereof. Many modifications of the above embodiment can be made without departing from the spirit of the present invention.

What is claimed is:

1. Controlling switch structure of an atomizer handle, comprising a handle main body, a trigger, a stop lever, a long pivot pin, a short pivot pin, a controlling pin, a compression spring and a sealing cap, said controlling switch structure being characterized in that:

a front end face of the main body is formed with an axial water outgoing passage and a rear end face of the main body is formed with an axial water incoming passage, the front section of the main body being formed with a radial stepped socket having a small diameter section communicating with the water outgoing passage and a large diameter section communicating with the water incoming passage, a top edge of the front end of the main body being disposed with a pivot seat formed with a pivot hole, a pivot block formed with a pivot hole being disposed on rear side of the pivot seat;

a lower edge of the front end of the trigger is formed with a pivot hole, the top face of the front section of the trigger being formed with a rectangular perforation, two sides of rear end of the rectangular perforation being respectively disposed with two arched retaining blocks;

one end of the stop lever is disposed with two pivot plates each having a pivot hole, the other end thereof being disposed with a cam-like engaging section;

a lower section of the controlling pin is disposed with a toothed flange, a large water sealing ring being inlaid on upper side of the toothed flange, a middle section of the controlling pin being formed with an annular groove, the upper section of the controlling pin being inlaid with two small water sealing rings; and a stepped fitting boss is disposed at the center of the sealing cap, whereby the two pivot plates of the stop lever are fitted on two sides of the pivot block of the main body, the short pivot pin being passed through the pivot holes of the pivot plates and the pivot hole of the pivot block to pivotally connect the stop lever with the main body, the trigger being positioned on top face of the main body and pivotally connected therewith by the long pivot pin, the stop lever being fitted in the rectangular perforation of the trigger, the controlling pin being fitted into the stepped socket of the main body, the upper end section of the controlling pin protruding beyond the stepped socket to abut against the bottom face of the front section of the trigger, the compression spring being fitted into the large diameter section of the stepped socket of the main body, the sealing cap being screwed onto the wall of the opening of the large diameter section of the stepped socket, the spring being resiliently compressed between the lower end section of the controlling pin and the stepped fitting boss of the sealing cap to a certain extent, whereby the controlling pin is lifted to press the large water sealing ring against the shoulder section of the stepped socket of the main body so as to seal the water so that the controlling pin is pressed by both of the resilient force of the compression spring and the water pressure to reliably seal the water.

2. Controlling switch structure of an atomizer handle as claimed in claim 1, wherein the top edge of front end of the main body is disposed with a restricting plate, the middle of rear face of upper end of the restricting plate being disposed with a trapezoid restricting block, the front end face of the trigger being a slope face, whereby sealing the water, the slope front end face of the trigger is restricted by the trapezoid restricting block of the restricting plate of the main body.

* * * * *